United States Patent [19]
Molpus et al.

[11] Patent Number: 5,184,124
[45] Date of Patent: Feb. 2, 1993

[54] METHOD AND APPARATUS FOR COMPRESSING AND STORING PIXELS

[75] Inventors: J. Lane Molpus, Larkspur; Adam Levinthal, Redwood City; Ross Werner, Woodside, all of Calif.

[73] Assignee: Next Computer, Inc., Redwood City, Calif.

[21] Appl. No.: 637,598

[22] Filed: Jan. 2, 1991

[51] Int. Cl.⁵ .............................................. H03M 7/30
[52] U.S. Cl. ........................................ 341/50; 341/87; 358/261.4
[58] Field of Search .................. 341/50, 87, 95, 99, 341/106; 358/12, 13, 903, 133, 141, 426, 261.4; 364/927.3

[56] References Cited
U.S. PATENT DOCUMENTS
4,605,952  8/1986  Powers ................................. 358/13

*Primary Examiner*—A. D. Pellinen
*Assistant Examiner*—B. K. Young
*Attorney, Agent, or Firm*—Hecker & Harriman

[57] ABSTRACT

A method and apparatus for a processor or other system device to map processor words to an associated random access memory. In one case, processor words are mapped directly to RAM with no modification. In another case, 32-bit pixels (eight bits each of red, green, blue and alpha) are converted to or from 16-bit pixels (four bits each of red, green, blue and alpha) using an ordered dithering technique. The ordered dithering technique spatially distributes the information that would otherwise be lost by truncation. This is accomplished by replacing exact pixel values with their pseudo-random average. This reduces the required pixel storage requirements by half, while maintaining a higher image quality than would be achieved by truncation alone.

63 Claims, 5 Drawing Sheets

METHOD AND APPARATUS FOR COMPRESSING AND STORING PIXELS

BACKGROUND OF THE PRESENT INVENTION

1. Field of the Invention

This invention relates to the storage of pixel information in a memory means.

2. Background Art

Computer graphics and imaging systems often use color displays as output devices, or as a means to view work in progress before generating a color print output. Color graphics and images are stored in a computer memory system as an array of picture elements (pixels). Each pixel contains information representing red (R), green (G), blue (B) and opacity, or "alpha" (A) information. The R, G and B components of a pixel determine the relative amounts and intensities of the red, green and blue components of the display pixel. By varying the amounts of these primary colors, different colored output pixels are defined. The alpha component defines the opacity of the pixel, and is used primarily when assembling images; it does not normally affect the display of assembled pixels.

Figure 1:
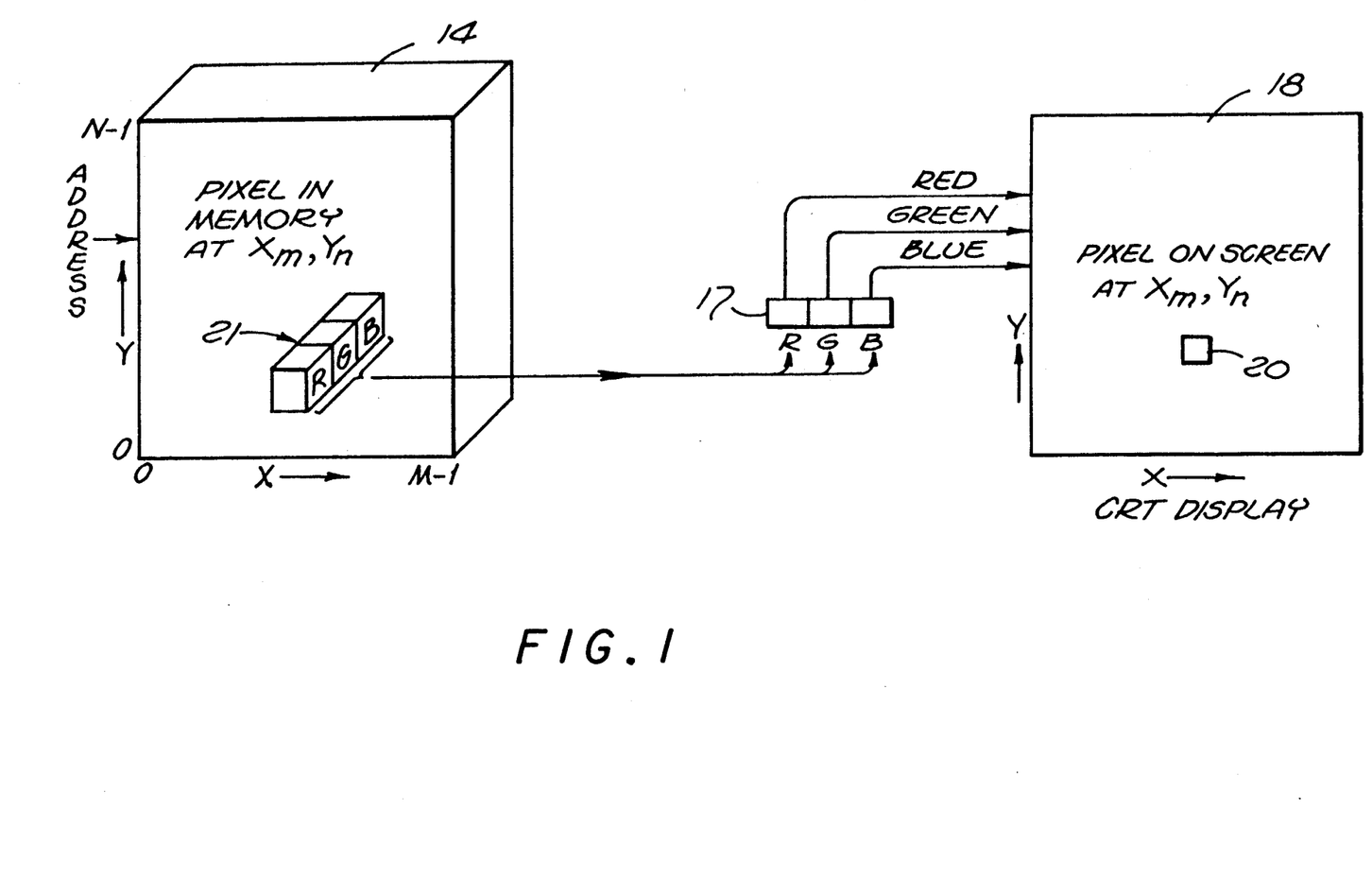
FIG. 1 is a diagram of a method of storing pixel information and providing it to a display.

An example of a system for displaying RGBA color is illustrated in FIG. 1. A refresh buffer 14, also known as a video RAM, or VRAM, is used to store color information for each pixel to be displayed on a video display, such as CRT display 18. A dynamic random access memory (DRAM) can also be used as buffer 14. The VRAM 14 contains one memory location for each pixel location on the display 18. For example, pixel 20 at screen location $X_m Y_n$ corresponds to memory location 21 in the VRAM 14. The number of bits stored at each memory location for each display pixel varies depending on the amount of color resolution required. For example, for word processing applications or display of text, images having two intensity levels are acceptable so that only a single bit need be stored at each memory location (the screen pixel is either "on" or "off"). For color images, however, a plurality of intensities must be definable. For certain high-end color graphics applications, it has been found that 32 bits per pixel (eight bits each of R, G, B and A components) produce acceptable images.

Figure 2:
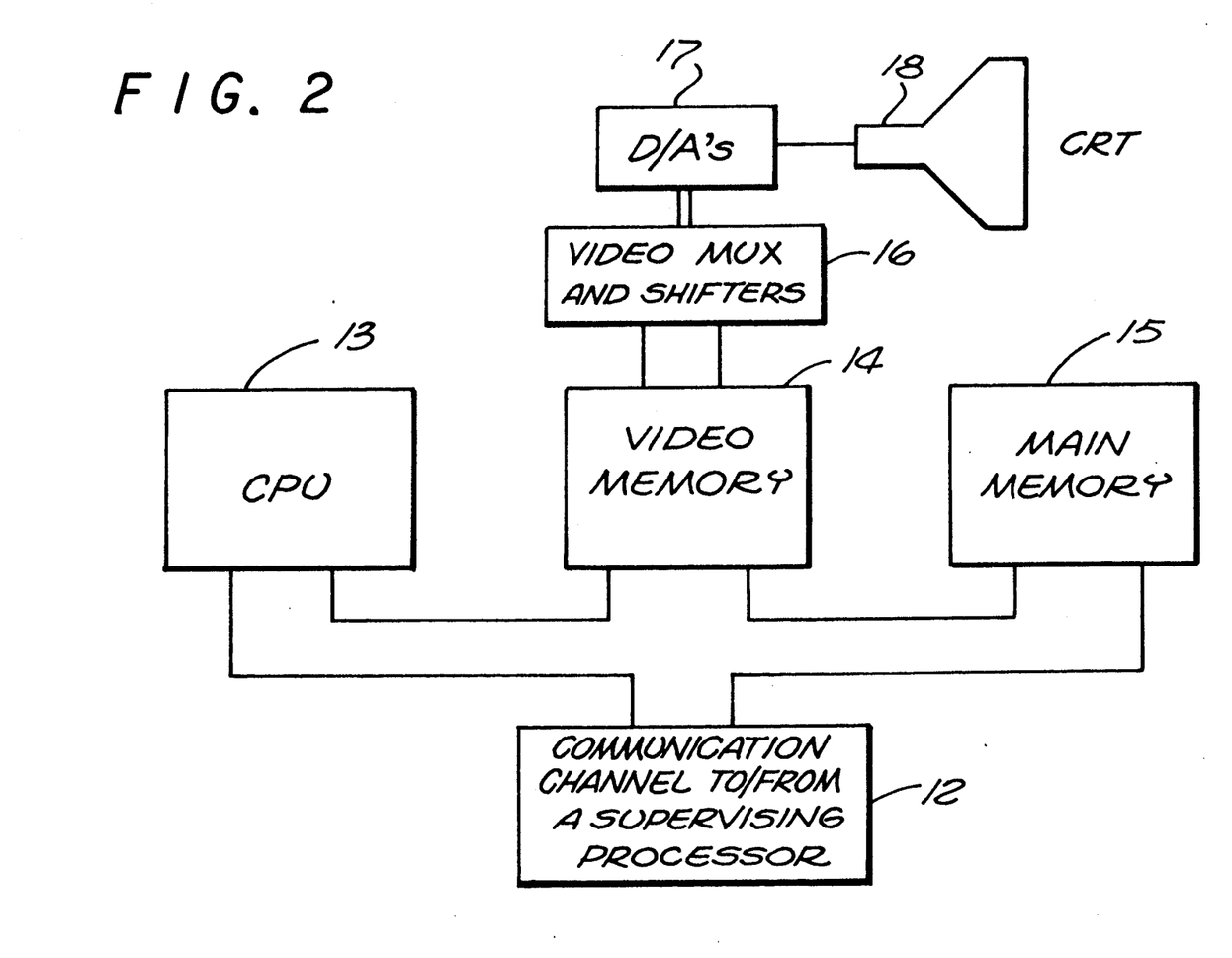
FIG. 2 is a block diagram illustrating an example of a computer system utilizing the present invention.

Consider, for example, that in the system of FIG. 2, an image is stored in memory and 32 bits are stored for each image pixel. Each pixel of the image is represented by 8 bits each for the red, green, blue and alpha components of the pixel. A display image is assembled from this stored information, and the alpha component is used to determine the visibility of pixels included in the assembled image. Thereafter, the R, G and B components of the display pixel are provided to VRAM 14.

At memory location 21, there are eight bits each for the red, green and blue components of the display pixel. The eight most significant bits of the VRAM memory location are used to represent the red component, the next eight bits represent the green component, and the eight least significant bits represent the blue value. This permits 256 shades each of red, green and blue to be defined.

The bits corresponding to the R, G and B components are provided to the R, G and B D/A converters 17, respectively. The red, green and blue signals drive the red, green and blue phosphors at a pixel location 20 on the display. By varying the intensities of the red, green and blue components, different colors may be produced at that pixel location.

The resolution of the image of the display is dependent on the number of brightness or color levels that each pixel can represent. The greater the number of bits that represent each pixel, the greater the number of brightness levels (and correspondingly, shades of color) that can be defined. In the system described herein, with eight bits each of red, green and blue components per pixel, over 16 million possible colors can be displayed.

A disadvantage of high resolution color display systems is the large pixel storage requirement. It is often desired to reduce the number of bits representing each pixel so storage requirements can be reduced. However, a reduction in the number of bits defining a pixel results in a reduction in the pixel bit resolution, hence a desire to reduce pixel size in a manner such that the lost bit resolution in another form.

The bit resolution of a pixel is important in the resolution and clarity of the image produced on a display. Display images are comprised of a plurality of pixels that, when viewed together, combine to form an image.

One prior art compression scheme is implemented in Adobe's PostScript software. A general method is provided for compressing N bits to M bits, known as "ordered dither." An example is given here for the case of an 8-bit source pixel compressed to a 4-bit target pixel.

The 8-bit source pixel components have a range of 0 to 255, representing a linear intensity from black to white, respectively. The 4-bit target pixel components have a range of 0 to 15 to represent the same intensity range. The ratio of maximum source to target intensities is $255/15 = 17$ (such integer relationships hold for ratios of $(2^n - 1)/(2^m - 1)$ when m is a factor of n. Thus, dithering 12-bit components to 3-bit components or 10-bit to 5-bit result in an integer ratio; dithering 10-bit to 3-bit does not).

Thus, each step in target intensity represents 17 steps of source intensity:

| Target | Source |
|---|---|
| 0 | 0 → 16 |
| 1 | 17 → 33 |
| 2 | 34 → 50 |
| 3 | 51 → 67 |
| 4 | 68 → 84 |
| 5 | 85 → 101 |
| 6 | 102 → 118 |
| 7 | 119 → 135 |
| 8 | 136 → 152 |
| 9 | 153 → 169 |
| 10 | 170 → 186 |
| 11 | 187 → 203 |
| 12 | 204 → 220 |
| 13 | 221 → 237 |
| 14 | 238 → 254 |
| 15 | 255 |

To convert an n-bit source to m-bit target, two values are calculated, BASE and DELTA. BASE is the integer part of source/17. DELTA is 15 (source modulo 17). BASE is in the range 0-15; DELTA is in the range 0-255 (the range 0-255 is chosen to be the generic threshold matrix depth for PostScript; the scale by 15 would be unnecessary if the threshold matrix depth was 17).

A threshold matrix of dimensions WIDTH by HEIGHT is addressed by $(X + X\phi)$ modulo-WIDTH, and $(Y + Y\phi)$ modulo-HEIGHT, where $(X,Y)$ are the coordinates of the source pixel in an image, and ($X\phi,Y\phi$) is a phase adjustment between the image and some reference (such as the origin of the raster display in which the image is located). Typically the threshold matrix contains an even distribution of values. The criteria determining WIDTH, HEIGHT and spatial distribution within the array are outside the scope of this discussion.

The addressed value from the threshold matrix determines the final target value. If DELTA is less than the addressed threshold value, the final target is (base). If DELTA is greater than or equal to the addressed threshold value, the final target is (base+1). Assuming a sufficiently large matrix and an even distribution of values, the ratio of (base) to (base+1) target values resulting from a given source value will be delta/256. The detail lost in bit resolution is thus regained as noise distributed spatially.

SUMMARY OF THE INVENTION

The present invention provides a method and apparatus for a processor or other system device to map processor words to an associated random access memory in one of two ways. In one case, processor words are mapped directly to RAM with no modification. In another case, 32-bit pixels (eight bits each of red, green, blue and alpha) are converted to or from 16-bit pixels (four bits each of red, green, blue and alpha) using an ordered dithering technique. The ordered dithering technique spatially distributes the information that would otherwise be lost by truncation by replacing exact values with pseudo random averages. This reduces the required pixel storage requirements by half, while maintaining a higher image quality than would be achieved by truncation alone.

The present invention provides a compression scheme that is substantially transparent to the system processor. The processor can store data in compressed format simply by selecting appropriate addresses in the RAM. The RAM is divided into encoded and non-encoded regions. When an address of the encoded region is selected, the data written to that address is automatically compressed by a 2:1 ratio. When data from an address in the encoded space is read from the RAM, the data is automatically decompressed by replicating each nibble.

The compression scheme used in the preferred embodiment of this invention is accomplished by generating a BASE and DELTA value for each 8-bit component of the source data word. The BASE value is a 4-bit value calculated by performing shifts and subtracts on the source data word. The DELTA value is a five-bit (or four-bit) value dependent on the source data word and the BASE value generated for that data word. The DELTA value is then combined with a threshold value generated by passing the source address through a dither matrix. If the combined DELTA/threshold value exceeds a certain level, the BASE value is incremented by one. Otherwise, the calculated BASE value is the compressed value to be stored in RAM.

DETAILED DESCRIPTION OF THE INVENTION

A method and apparatus for storage of dithered and undithered pixels is described. In the following description, numerous specific details, such as bit-per-pixel resolution, word lengths, etc., are set forth in detail in order to provide a more thorough description of the present invention. It will be apparent, however, to one skilled in the art, that the present invention may be practiced without these specific details. In other instances, well known features have not been described in detail so as not to obscure the present invention.

The present invention may be implemented on any conventional or general purpose computer system. An example of one embodiment of a computer system for implementing this invention (in this case, a peripheral to a host processor) is illustrated in FIG. 2. A communication port 12 receives commands and data from, and returns data to, a supervising processor. The computer system of FIG. 2 also includes a video memory 14 and main memory 15, all coupled by a bidirectional system bus 19 to CPU 13 and communication port 12.

Bus 19 may contain, for example, 32 address lines for addressing video memory 14 or main memory 15. The system bus 19 also includes, for example, a 64-bit data bus for transferring data between and among the components, such as CPU 13, main memory 15, video memory 14 and communication channel 12. Alternatively, multiplexed data/address lines may be used instead of separate data and address lines.

In the preferred embodiment of this invention, the CPU 13 is a 64-bit microprocessor manufactured by Intel, the i860. However, any other suitable microprocessor or microcomputer may be utilized. The Intel microprocessor and its instruction set, bus structure and control lines, are described in i860 hardware and software reference manuals, published by Intel, Inc., of Santa Clara, Calif.

Main memory 15 is comprised of dynamic random access memory (DRAM) and in the preferred embodiment of this invention, comprises 8 to 64 megabytes of memory. More or less memory may be used without departing from the scope of this invention. The video memory 14 is a dual ported video random access memory, and in this invention, for example, consists of 4 mbytes of memory. However, more or less video memory may be provided, as well.

One port of video memory 14 is coupled to video multiplexer and shifter 16, which in turn is coupled to D/A converters 17. The DA converters 17 drive the cathode ray tube (CRT) raster monitor 18. Video multiplexing shifter circuitry 16 and D/A converters 17 convert pixel data stored in video memory 14 to a raster signal suitable for use by monitor 18. The video shifter 16 is informed of the size of each pixel (16 bits or 32 bits, for example). Monitor 18 is a type of monitor suitable for displaying graphic images, and in the preferred embodiment of this invention, has a resolution of 1120×832 pixels. Other resolution monitors may be utilized in this invention.

The present invention provides a 2:1 compression scheme for converting 8-bit pixel components to 4-bit values. This permits a 32-bit pixel to be stored in 16 bits. The dynamic range of each pixel is reduced when compressed from 32 bits to 16 bits. In general, a reduction in pixel dynamic range results in a reduction in display dynamic range. The present invention provides a compression and decompression scheme by reducing individual pixel dynamic range without sacrificing display dynamic range.

A disadvantage of a software implementation of a compression scheme is the time requirement for its operation. The present invention provides a hardware implementation of a compression scheme that performs compression and decompression more quickly than prior art software implementations. The present invention also implements its scheme with a memory mapping such that it can be operated by address selection. In addition, the hardware method of this invention reduces the calculation of BASE and DELTA to subtractions and shifts, which are easily and quickly implemented in hardware. This eliminates the need for division operations, which can be time consuming and require complex components.

The ordered dithered matrix of this invention is described as having 5-bit (or 4-bit) values, since a full 8-bit table is not required for 8-bit to 4-bit conversions. The matrix table is shared among four color components. This table sharing represents a 75% reduction in memory requirement over a non-shared implementation. A 16/17 approximation of this invention reduces table size and logic gate usage.

In the preferred embodiment of this invention, a microprocessor communicates with a video RAM by writing and reading "words" to/from the RAM. In the preferred embodiment, the processor communicates to the RAM via 64-bit words. Each word is considered to be two 32-bit pixels (with eight bits each of red, green, blue and alpha components) or four 16-bit pixels (with four bits on each of red, green, blue and alpha components). The word address is that of the left-most pixel and pixel addresses increase from left to right on the display.

The present invention accesses RAM in two ways, namely non-encoded and encoded. The mode is selected according to which of two regions of the RAM address space are accessed. The non-encoded region maps 64-bit processor words to 64-bit RAM words and each word consists of two 32-bit or four 16-bit pixels, and are passed to and from RAM unmodified.

The encoded region maps 64-bit words of two 16-bit pixels. 32-bit pixels are converted to 16-bit pixels by the dithering hardware of the present invention and are stored in RAM as compressed pixels. This dithering process is invoked automatically by writing to the encoded address space. Thus, the compression is transparent to the computer system and any software running on that computer system. The 16-bit encoded pixels can be retrieved by reading the corresponding locations in the non-encoded regions. They can also be retrieved as 32-bit pixels by reading the same locations in the encoded region. In this case, the hardware replicates the 4-bit components of the stored 16-bit pixels as the most significant bits and least significant bits (MSB's and LSB's, respectively) of the 8-bit components of the 32-bit pixels.

Although this invention is described in terms of 64-bit words, 32-bit and 16-bit pixels, any number of pixels can be handled by this scheme. This scheme has particular application in the case of N-bit to M-bit conversion, where N is greater than M and M is a factor of N.

The present invention uses an address mapping scheme as illustrated in Table 1 below. The encoded region appears twice as large as the non-encoded region, since each 32-bit pixel represents only 16 bits of storage. The page increments are given for purposes of example only. A similar mapping scheme could be created in any RAM address space.

TABLE 1

| Start | End | Size Region | |
|---|---|---|---|
| 0000000 | 1FFFFFF | 32MB Encoded | DRAM page 0 |
| 2000000 | 3FFFFFF | 32MB Encoded | DRAM page 1 |
| 4000000 | 5FFFFFF | 32MB Encoded | DRAM page 2 |
| 6000000 | 7FFFFFF | 32MB Encoded | DRAM page 3 |
| 8000000 | 8FFFFFF | 16MB Non-Encoded | DRAM page 0 |
| 9000000 | 9FFFFFF | 16MB Non-Encoded | DRAM page 1 |
| A000000 | AFFFFFF | 16MB Non-Encoded | DRAM page 2 |
| B000000 | BFFFFFF | 16MB Non-Encoded | DRAM page 3 |

Figure 6:
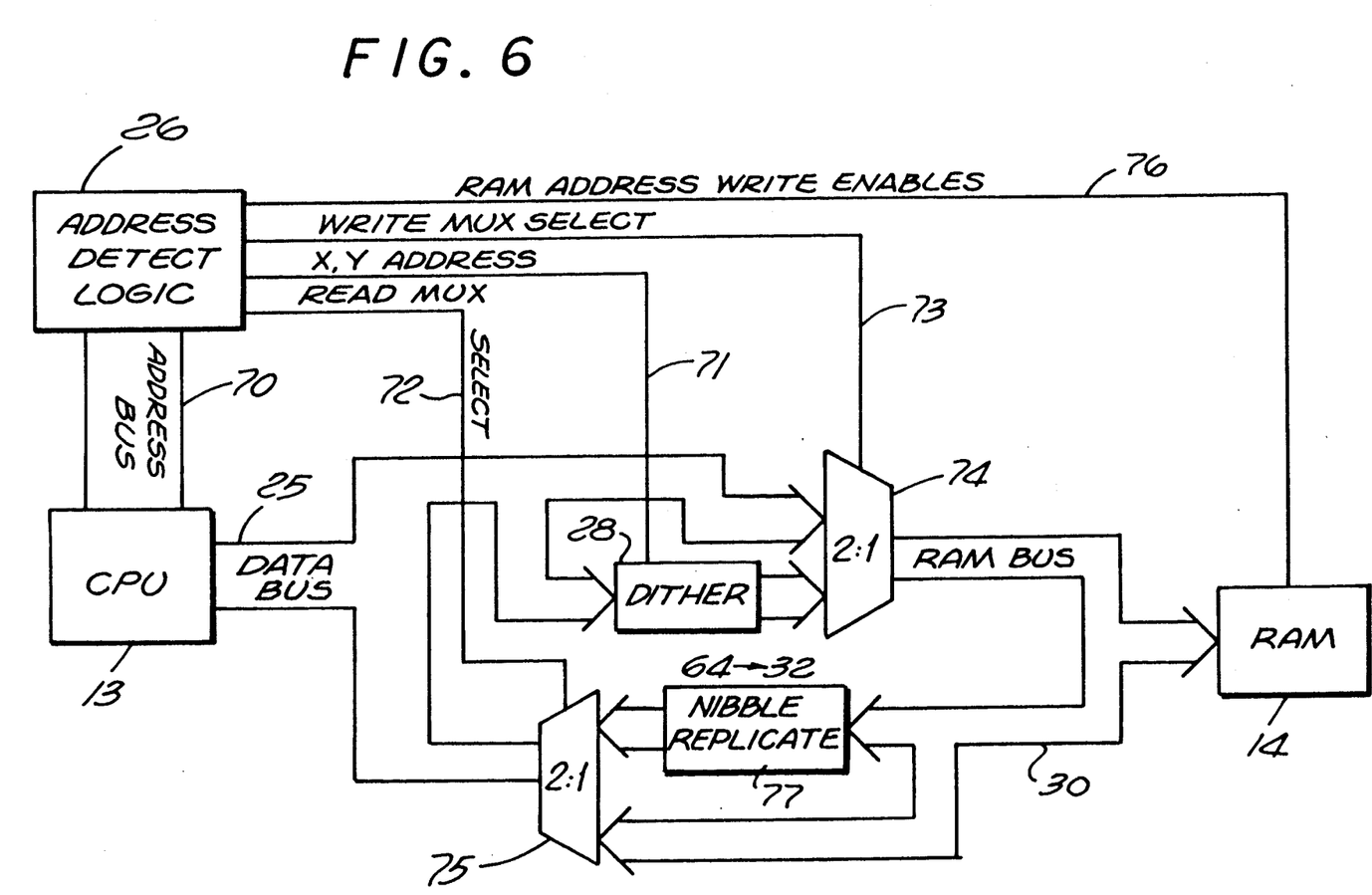
FIG. 6 is a block diagram of the present invention.

A block diagram of the present invention is illustrated in FIG. 6. A processor such as CPU 13 is coupled to an address detect logic block 26 via address bus 70. CPU 13 is also coupled, through data bus 25, to multiplexers 74 and 75 and dither block 28. Dither block 28 is also coupled to multiplexer 74. The address detect logic block 26 provides read mux select signals on line 72 to multiplexer 75, x,y address signals on line 71 to dither block 28, write mux select signals on line 73 to multiplexer 74, and RAM address and write enable signals on line 76 to RAM 14. RAM 14 is coupled to multiplexers 74 and 75 through RAM bus 30, and to nibble replicate block 77. Nibble replicate block 77 is coupled to multiplexer 75.

In operation, the CPU 13 provides RAM address on address bus 70 to address detect block 26. Address detect block 26 determines if the CPU is writing to the encoded address space of the RAM 14 or the non-encoded address space. If the CPU is writing to the encoded address space, the pixel (x,y) address and data are provided on lines 71 and 25, respectively, to dithering block 28. Dithering block 28 maps two 32-bit pixels to two 16-bit pixels. Write mux select signal on line 73 enables multiplexer 74 to provide the output of dither block 28 onto the upper and lower halves of RAM bus 30. If the detected address is to the non-encoded address space, the write mux select signal on line 73 enables the multiplexer 74 to provide the data directly from data bus 25 to RAM bus 30. Since converting 64 bits to 32 bits uses only half the memory width, the address detect logic gates the write enables to the appropriate half of memory, as indicated by the LSB of the encoded pixel space address.

If the CPU reads data from a non-encoded address, the read mux select signal on line 72 causes the multiplexer 75 to provide the data from RAM bus 30 to the data bus 25. If the CPU 13 reads from an encoded address, the read mux select signal on line 72 causes the multiplexer 75 to select the output of nibble replicate block 77 to data bus 25. The nibble replicate block 77 in effect reverses the operation of dither block 77 so that two 16 bit pixels are read as two 32 bit pixels. Since converting 16 bits to 32 bits uses only half the memory width, the address detect logic gates the read mux control to select the appropriate half of memory, as indicated by the LSB of the encoded pixel space address.

Figure 3:
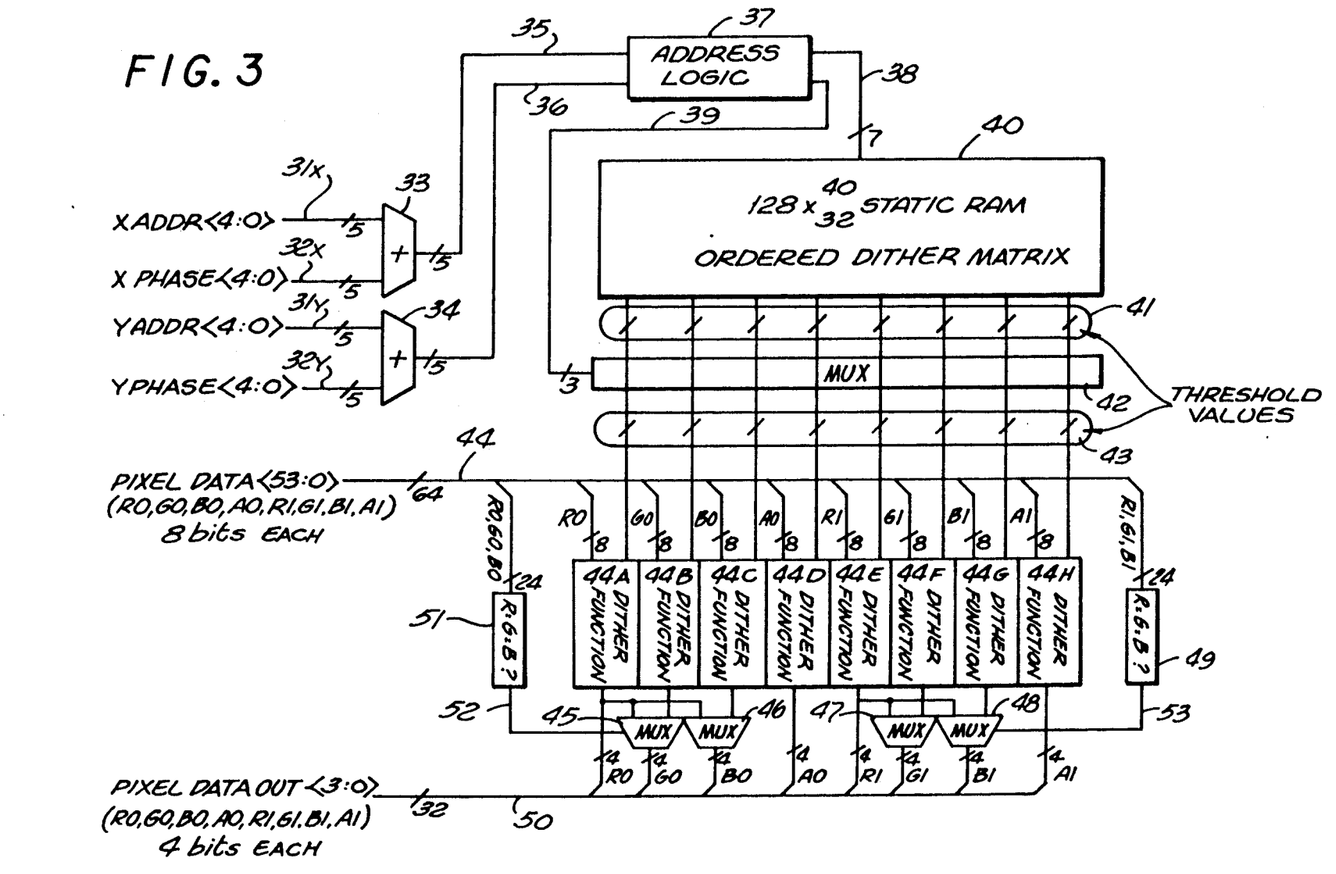
FIG. 3 is a schematic diagram illustrating the dithering scheme of the present invention.

The preferred embodiment of the dither block 28 is illustrated in FIG. 3. The X address 31X and X phase 32X of an address in the encoded memory space is provided to adder 33. In the example shown, the X address 31X and Y address 31Y are 5 bits in length. The Y address 31Y and Y phase 32Y (also 5 bits each in this embodiment) are provided to adder 34. Outputs 35 and 36 from adders 33 and 34, respectively, are provided to address logic block 37. Address logic block 37 provides a 7-bit output 38 to ordered dither matrix block 40 and a 3-bit output 39 to multiplexer 42. The matrix block 40 provides eight outputs on lines 41 to multiplexer 42. These values are 5 or 4 bits. The multiplexer 42 provides 8 outputs on lines 43 to dither function blocks 44A–44H respectively.

64-bit pixel data words 44 define two 32-bit pixels. Therefore, each 64-bit word has 8-bit R0, G0, B0 and A0 components from the first pixel and 8-bit R1, G1, B1, and A1 components from the second pixel. The R0, G0 and B0 components are provided to comparator 51 and the R1, G1, and B1 components are provided to comparator 49. These comparators determine if the R, G, and B values are equal, indicating a monochrome pixel.

The R0, G0, B0, and A0 components of the first pixel are provided to dither function blocks 44A–44D respectively, along with threshold values from multiplexer 42. The R1, G1, B1, and A1 components of the second pixels provided to dither function blocks 44E–44H respectively along with threshold values from multiplexer 42. Dither function block 44A provides a 4-bit R0 component that is coupled to data output bus 50. The 4-bit R0 component is also provided to multiplexers 45 and 46 respectively. Dither function block 44B provides an output to multiplexer 45 and dither function block 44C provides an output to multiplexer 46. The output of multiplexer 45 is a 4-bit G0 component and the output of multiplexer 46 is a 4-bit B0 component. The G0 and B0 components are also coupled to pixel data output bus 50. Dither function block 44D provides a 4-bit A0 component to bus 50.

Dither function block 44E provides a 4-bit R1 component output to pixel bus 50 and to multiplexers 47 and 48. Dither function blocks 44F and 44G provide outputs to multiplexers 47 and 48 respectively. Multiplexers 47 and 48 provide 4-bit output G1 component and 4-bit output B1 component to pixel data bus 50. Dither function block 44H provides a 4-bit A1 component to bus 50. Comparator 51 provides an output 52 to multiplexers 45 and 46. Comparator 49 provides an output 53 to multiplexers 47 and 48.

Dither Matrix

The threshold values are stored in the ordered dither matrix 40, a 32×32 array of precomputed five or four-bit numbers. The five LSB's of the X and Y display addresses 31X and 31Y of the left pixel are added, modulo-32, to five-bit X and Y phase registers, 32X and 32Y, respectively. The resulting X address 35 and Y address 36 address the table. Since the window with which the pixels are associated may be placed anywhere in the display, and since the dither matrix should be correlated to the pixel array within the window and not the entire display, the phase registers provide the means to compensate for arbitrary alignment between the window and the display. The following values are calculated (in software, for example) and provided to the dither hardware, assuming the display window origin to be [0,0]:

$X\phi = (0 - \text{window\_X\_origin})$ and $1F_{16}$ $Y\phi = (0 - \text{window\_Y\_origin})$ and $1F_{16}$ The dither matrix 40 is a 32×32 array of five or four bit numbers, eight of which are accessible in parallel in a single 40-bit or 32-bit word. The table is arranged such that the dither values for two pixels, the addressed pixel and the pixel to its right, are read in parallel. The values read from the table for a given address [Y<4:0>,X<4:0>] are:

| Table Bits | Addressed Value |
|---|---|
| <39:35> | left pixel, Red |
| <34:30> | left pixel, Green |
| <29:25> | left pixel, Blue |
| <24:20> | left pixel, Alpha |
| <19:15> | right pixel, Red |
| <14:10> | right pixel, Green |
| <09:05> | right pixel, Blue |
| <04:00> | right pixel, Alpha |

To eliminate the need for four separate tables, the Green, Blue, and Alpha dither tables are merely spatial offsets into the Red table. The address given to the table specifies the dither value for the Red component. The Green table is equivalent to the Red table shifted 16 pixels to the left, the Blue table is equivalent to the Red table shifted 16 pixels up, and the Alpha table is equivalent to the Red table shifted 16 pixels up and 16 pixels to the left.

In the preferred embodiment there are two tables, even and odd. The even table stores the dither values for pixels at even X addresses. The odd table stores the dither values for pixels at odd X addresses.

When X<0> is 0 (i.e., the word is aligned such that the left pixel is on an even pixel address boundary), then {Y<3:0>, X<3:1>} address both tables. The outputs of the even table are applied to the left pixel, the outputs of the odd table are applied to the right pixel.

When X<0> is 1 (i.e., the word is aligned such that the left pixel is on an odd pixel address boundary), then {Y<3:0>, X<3:1>} address the odd table, the outputs of which are applied to the left pixel. {Y<3:0>, (X<3:1>+1)} address the even table, the outputs of which are applied to the right pixel.

The outputs of each table are the dither values for the Red, Green, Blue, and Alpha components. Spatially, these are:

| [Y, X ] |
|---|
| [Y, X+16] |
| [Y+16, X ] |
| [Y+16, X+16] |

These are multiplexed into the appropriate component locations according to Y<4> and X<4>:

| {Y<4>,X<4>} | Addressed Pixel | Component |
|---|---|---|
| 0 0 | [Y, X ] | Red |
|  | [Y, X+16] | Green |
|  | [Y+16, X ] | Blue |
|  | [Y+16, X+16] | Alpha |
| 0 1 | [Y, X ] | Green |
|  | [Y, X+16] | Red |
|  | [Y+16, X ] | Alpha |
|  | [Y+16, X+16] | Blue |
| 1 0 | [Y, X ] | Blue |

| {Y<4>,X<4>} | Addressed Pixel | Component |
|---|---|---|
| | [Y,      X+16] | Alpha |
| | [Y+16, X     ] | Red |
| | [Y+16, X+16] | Green |
| 1 1 | [Y,      X     ] | Alpha |
| | [Y,      X+16] | Blue |
| | [Y+16, X     ] | Green |
| | [Y+16, X+16] | Red |

DITHER BLOCK

Figure 4:
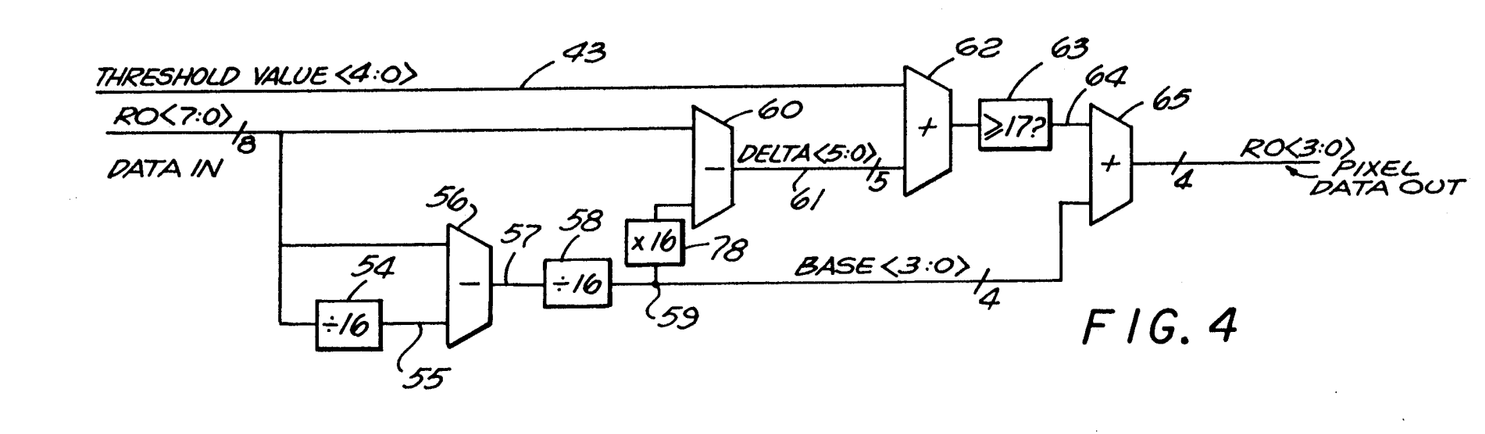
FIG. 4 is a schematic diagram illustrating a preferred embodiment of the dither block of FIG. 3.

A detailed diagram of the dither function block 44A of FIG. 3 is illustrated in FIG. 4. Dither function block 44A is shown in detail to provide an example of this circuitry. In the preferred embodiment of this invention, dither function blocks 44B–44H are comprised of identical circuitry. The 8-bit R0 component from the pixel input bus 44 is provided to one input of subtractor 56 and to divide-by-16 block 54. Divide-by-16 block is a hardwired shift that effectively performs a division with no hardware.

The output 55 of divider 54 is provided to the other input of subtractor 56. The output 57 of subtractor 56 is provided to a second divide-by-16 block 58. This divider is also a hardwired shift circuit. The output 59 of divider 58 is the BASE value, and, after being multiplied by sixteen at multiplier block 78 (again, a wired shift), is coupled as one input to subtractor 60 along with the 8-bit R0 input. The output 59 is comprised of the four most significant bits of the output of divider 58. The output 61 of subtractor 60 is a five-bit DELTA value and represents the five least significant bits. This DELTA value 61 is provided as one input to adder 62. The other input of adder 62 is the threshold value from line 43 of multiplexer 42. This is a five-bit value.

The output of adder 62 is coupled to comparator 63 to determine if the output is greater than or equal to 17. The output 64 of comparator 63 is coupled to one input of adder 65. The BASE value 59 is coupled to the other input of adder 65. Adder 65 provides a 4-bit output R0 which is provided to pixel data out bus 50 (of FIG. 3).

The BASE and DELTA of each component of the two incoming pixels are calculated by shifts and subtracts:

BASE=(source−(source/16))/16; [four bits]

DELTA=(source−(BASE×16)); [five bits]

which are equivalent to:

BASE=source/17; [four bits]

DELTA=source modulo 17; [five bits]

but do not require any multiples or divides (equations are shown as C-language-like integer operations).

The BASE value is calculated by the equation (source−(source/16))/16) where the source is the 8 bit input value, such as the R0 input of FIG. 4. The source is divided by sixteen at divide block 54 and subtracted from the source value at subtracter 56. The resultant is then divided by sixteen at block 58. This is the BASE value. The BASE, multiplied by sixteen at block 78 is subtracted from the source by subtractor 60 to yield DELTA 61, the five LSB's of the output of subtractor 60.

A five-bit threshold value 43 (from the ordered dither matrix, described above) is then added to each DELTA 61. If the sum is less than 17, BASE is output as the target value. If the sum is greater than or equal to 17, (BASE+1) is output as the target value. These output nibbles become the resulting 16-bit pixel.

The comparators 51 and 49 (of FIG. 3) determine if the R, G, and B components of an incoming pixel are equal (i.e., monochrome video), in which case the dithered R value is also output for the G and B components. This prevents the colored artifacts that could be introduced into a monochrome image should different values result for R, G, and B. Alpha dithering is not affected by this compare.

The Alpha component is dithered separately from Red, Green, and Blue components. A threshold value is obtained for Alpha which is independent of the threshold values for the other components. Since, by convention, pixel component values are pre-multiplied by Alpha, the Red, Green, and Blue components will always be less than or equal to Alpha. Dithering should not create a Red, Green, or Blue larger than the accompanying Alpha. The preferred solution is to select the largest of the Red, Green, and Blue threshold values and apply this to Alpha. In the case of monochrome pixels, the same threshold value would be used for all four components.

Figure 5:
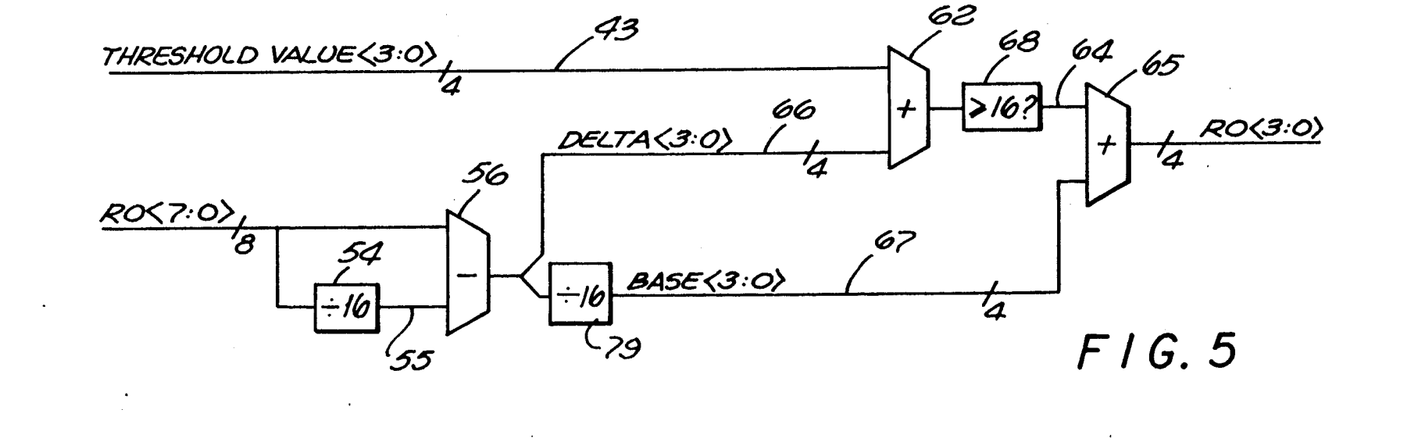
FIG. 5 is a schematic diagram illustrating an alternate embodiment of the dither block of FIG. 3.

An alternate embodiment of the dither function block 44A is illustrated in FIG. 5. The 8-bit R0 component is coupled to divide-by-16 block 54 and to one input of subtractor 56. The output 55 of divider block 54 is coupled to the other input of subtractor 56. The subtractor 56 provides a DELTA output 66 representing the four least significant bits and after being divided by sixteen at divider block 79, a BASE 67 is output to one input of adder 65. The DELTA value 66 is provided to one input of adder 62 along with the four-bit threshold value from line 43 of mux 42. The output of adder 62 is coupled to comparator block 68 to determine if the value is greater than or equal to 16. The output 69 of comparator 68 is coupled as one input of adder 65. The output of adder 65 is a 4-bit dithered R0 value.

In the scheme of FIG. 5, the BASE and DELTA of each component of the two incoming pixels are calculated by shifts and subtracts as follows:

BASE=(source−(source/16))/16; [four bits]

DELTA=(source−(source/16)) modulo 16; [four bits]

which are equivalent to:

BASE=source/17; [four bits]

DELTA=BASE modulo 16; [four bits]

and again do not require any multiplies or divides. Unlike the implementation described in FIG. 4, the four-bit DELTA can represent only 16 of the 17 possible values; two of each seventeen values of the 5-bit DELTA map to only one of the sixteen values of the four-bit DELTA. This causes fifteen discontinuities, evenly spaced, in the transform of source values to target values, but reduces hardware required.

The BASE value is calculated by the equation (source−(source/16)) where the source is the eight bit R0 value. This source value is divided by sixteen at divider 54. The resulting value is subtracted from the source value at subtractor 56. The four least significant bits of the result are the DELTA and the four most significant bits divided by 16, are the BASE.

Four-bit threshold values 43 are added to each DELTA 66. If the sum is less than 16, BASE is output as the target value. If the sum is greater than or equal to 16, (BASE+1) is output as the target value. These nibbles are the resulting 16-bit pixel.

The table is again a 32×32 array of numbers, but of four bits each:

| Table Bits | Addressed Value |
|---|---|
| <31:28> | left pixel, Red |
| <27:24> | left pixel, Green |
| <23:20> | left pixel, Blue |
| <19:16> | left pixel, Alpha |
| <15:12> | right pixel, Red |
| <11:08> | right pixel, Green |
| <07:04> | right pixel, Blue |
| <03:00> | right pixel, Alpha |

In all other aspects the 16/17 approximation is identical to the full implementation. One advantage of the embodiment of FIG. 5 is its reduced table size (20% smaller) and narrower bit paths, requiring fewer gates.

Thus, a method and apparatus of for compressing and storing pixel data is described.

We claim:

1. A circuit comprising:
   processing means for providing a memory address and a data word of a first number of bits;
   storage means coupled to said processing means for storing said data word, said storage means having at least first and second address spaces;
   address decoding means coupled to said processing means to determine if said memory address provided by said processing means is found in said first or second address space;
   compression means coupled to said address decoding means, said processing means and to said storage means, said compression means for compressing said data word when said data word is written to said first address space.

2. The circuit of claim 1 wherein said compression means comprises:
   a matrix coupled to said processing means for receiving said memory address and for generating a threshold value based on said memory address;
   a compression block coupled to said processing means and said matrix, said compression block for receiving said threshold value and said data word and for providing an output value having a second number of bits less than said first number of bits.

3. The circuit of claim 2 wherein said compression block comprises:
   first converting means for receiving said data word and for generating a BASE value based on said data word;
   second converting means coupled to said first converting means for receiving said BASE value and said data word and for generating a DELTA value based on said BASE value and said data word;
   first summing means for combining said DELTA value with said threshold value and providing a first output;
   comparing means coupled to said first output and for generating a second output having a first value if said first output exceeds a reference value and a second value when said first output does not exceed said reference value;
   second summing means for combining said BASE value and said second output and providing said output value having said second number of bits.

4. The circuit of claim 1 wherein said data word comprises first, second, and third components.

5. The circuit of claim 4 wherein BASE and DELTA values are generated for each of said first, second, and third components.

6. The circuit of claim 4 wherein said first component is a red component, said second component is a green component and said third component is a blue component.

7. The circuit of claim 6 wherein further including means for comparing said red, green, and blue components of said data word and for generating said output value with equal red, green, and blue components when said red, green, and blue components of said data word are equal.

8. The circuit of claim 1 wherein said data word comprises first, second, third, and fourth components.

9. The circuit of claim 8 wherein BASE and DELTA values are generated for each of said first, second, third, and fourth components.

10. The circuit of claim 8 wherein said first component is a red component, said second component is a green component, said third component is a blue component, and said fourth component is an alpha component.

11. The circuit of claim 10 wherein further including means for comparing said red, green, and blue components of said data word and for generating said output value with equal red, green, and blue components when said red, green, and blue components of said data word are equal.

12. The circuit of claim 3 wherein said first converting means generates said BASE value as follows:

BASE=(source data −(source data/16))/16, where source data represents an intensity level of said data word.

13. The circuit of claim 3 wherein said second converting means generates said DELTA value as follows:

DELTA=(source data −(BASE×16)

where source data represents an intensity level of said word.

14. The circuit of claim 2 wherein said compression block comprises:
   converting means for receiving said data word and for generating a BASE value and a DELTA value based on said data word;
   first summing means for combining said DELTA value with said threshold value and providing a first output;
   comparing means coupled to said first output and for generating a second output having a first value if said first output exceeds a reference value and a second value when said first output does not exceed said reference value;
   second summing means for combining said BASE value and said second output and providing said output value having said second number of bits.

15. The circuit of claim 14 wherein said first converting means generates said BASE value as follows:

$$BASE = (\text{source data} - (\text{source data}/16))/16,$$

where source data represents an intensity level of said data word.

16. The circuit of claim 14 wherein said second converting means generates said DELTA value as follows:

$$DELTA = (\text{source data} - (\text{source data}/16)) \text{ modulo } 16,$$

where source data represents an intensity level of said data word.

17. A circuit comprising:
processing means for providing a memory address and a data word of a first number of bits;
storage means coupled to said processing means for storing said data word;
compression means coupled to said processing means and to said storage means, said compression means for compressing said data word;
said compression means comprising a matrix coupled to said processing means for receiving said memory address and for generating a threshold value based on said memory address, a compression block coupled to said processing means and said matrix, said compression block for receiving said threshold value and said data word and for providing an output value having a second number of bits less than said first number of bits.

18. The circuit of claim 17 wherein said compression block comprises:
first converting means for receiving said data word and for generating a BASE value based on said data word;
second converting means coupled to said first converting means for receiving said BASE value and said data word and for generating a DELTA value based on said BASE value and said data word;
first summing means for combining said DELTA value with said threshold value and providing a first output;
comparing means coupled to said first output and for generating a second output having a first value if said first output exceeds a reference value and a second value when said first output does not exceed said reference value;
second summing means for combining said BASE value and said second output and providing said output value having said second number of bits.

19. The circuit of claim 17 wherein said data word comprises first, second, and third components.

20. The circuit of claim 19 wherein BASE and DELTA values are generated for each of said first, second, and third components.

21. The circuit of claim 19 wherein said first component is a red component, said second component is a green component and said third component is a blue component.

22. The circuit of claim 21 wherein further including means for comparing said red, green, and blue components of said data word and for generating said output value with equal red, green, and blue components when said red, green, and blue components of said data word are equal.

23. The circuit of claim 17 wherein said data word comprises first, second, third, and fourth components.

24. The circuit of claim 23 wherein BASE and DELTA values are generated for each of said first, second, third, and fourth components.

25. The circuit of claim 23 wherein said first component is a red component, said second component is a green component, said third component is a blue component, and said fourth component is an alpha component.

26. The circuit of claim 25 wherein further including means for comparing said red, green, and blue components of said data word and for generating said output value with equal red, green, and blue components when said red, green, and blue components of said data word are equal.

27. The circuit of claim 18 wherein said first converting means generates said BASE value as follows:

$$BASE = (\text{source data} - (\text{source data}/16))/16,$$

where source data represents an intensity level of said data word.

28. The circuit of claim 18 wherein said second converting means generates said DELTA value as follows:

$$DELTA = (\text{source data} - (BASE \times 16)),$$

where source data represents an intensity level of said data word.

29. The circuit of claim 17 wherein said compression block comprises:
converting means for receiving said data word and for generating a BASE value and a DELTA value based on said data word;
first summing means for combining said DELTA value with said threshold value and providing a first output;
comparing means coupled to said first output and for generating a second output having a first value if said first output exceeds a reference value and a second value when said first output does not exceed said reference value;
second summing means for combining said BASE value and said second output and providing said output value having said second number of bits.

30. The circuit of claim 29 wherein said first converting means generates said BASE value as follows:

$$BASE = (\text{source data} - (\text{source data}/16))/16,$$

where the source data represents an intensity level of said data word.

31. The circuit of claim 29 wherein said second converting means generates said DELTA value as follows:

$$DELTA = (\text{source data} - (\text{source data}/16)) \text{ modulo } 16,$$

where the source data represents an intensity level of said data word.

32. The circuit of claim 17 wherein said storage means has a first address space and a second address space.

33. The circuit of claim 32 further including address decoding means coupled to said processing means to determine if said memory address provided by said processing means is found in said first or second address space;

said compression means for compressing said data word only when said data word is written to said first address space.

34. A circuit comprising:
processing means for providing a memory address and a data word of a first number of bits;
storage means coupled to said processing means for storing said data word, said storage means having at least first and second address spaces;
address decoding means coupled to said processing means to determine if said memory address provided by said processing means is found in said first or second address space;
compression means coupled to said address decoding means, said processing means and to said storage means, said compression means for compressing said data word when said data word is written to said first address space, said compression means comprising:
a matrix coupled to said processing means for receiving said memory address and for generating a threshold value based on said memory address;
a compression block coupled to said processing means and said matrix,
said compression block for receiving said threshold value and said data word and for providing an output value having a second number of bits less than said first number of bits, said compression block comprising:
first converting means for receiving said data word and for generating a BASE value based on said data word;
second converting means coupled to said first converting means for receiving said BASE value and said data word and for generating a DELTA value based on said BASE value and said data word;
first summing means for combining said DELTA value with said threshold value and providing a first output;
comparing means coupled to said first output and for generating a second output having a first value if said first output exceeds a reference value and a second value when said first output does not exceed said reference value;
second summing means for combining said BASE value and said second output and providing said output value having said second number of bits.

35. The circuit of claim 34 wherein said data word comprises first, second, and third components.

36. The circuit of claim 35 wherein said BASE and DELTA values are generated for each of said first, second, and third components.

37. The circuit of claim 35 wherein said first component is a red component, said second component is a green component and said third component is a blue component.

38. The circuit of claim 37 wherein further including means for comparing said red, green, and blue components of said data word and for generating said output value with equal red, green, and blue components when said red, green, and blue components of said data word are equal.

39. The circuit of claim 34 wherein said data word comprises first, second, third, and fourth components.

40. The circuit of claim 39 wherein said BASE and DELTA values are generated for each of said first, second, third, and fourth components.

41. The circuit of claim 39 wherein said first component is a red component, said second component is a green component, said third component is a blue component, and said fourth component is an alpha component.

42. The circuit of claim 41 wherein further including means for comparing said red, green, and blue components of said data word and for generating said output value with equal red, green, and blue components when said red, green, and blue components of said data word are equal.

43. The circuit of claim 34 wherein said first converting means generates said BASE value as follows:

$$BASE = (source\ data - (source\ data/16))/16,$$

where source data represents an intensity level of said data word.

44. The circuit of claim 34 wherein said second converting means generates said DELTA value as follows:

$$DELTA = (source\ data - (BASE \times 16)),$$

where source data represents an intensity level of said data word.

45. The circuit of claim 34 wherein said compression block comprises:
converting means for receiving said data word and for generating a BASE value and a DELTA value based on said data word;
first summing means for combining said DELTA value with said threshold value and providing a first output;
comparing means coupled to said first output and for generating a second output having a first value if said first output exceeds a reference value and a second value when said first output does not exceed said reference value;
second summing means for combining said BASE value and said second output and providing said output value having said second number of bits.

46. The circuit of claim 45 wherein said first converting means generates said BASE value as follows:

$$BASE = (source\ data - (source\ data/16))/16,$$

where source data represents an intensity level of said data word.

47. The circuit of claim 45 wherein said second converting means generates said DELTA value as follows:

$$DELTA = (source\ data - (source\ data/16))\ modulo\ 16,$$

where source data represents an intensity level of said data word.

48. A circuit comprising:
processing means for providing a memory address and a data word of a first number of bits;
storage means coupled to said processing means for storing said data word;
compression means coupled to said processing means and to said storage means, said compression means for compressing said data word;
said compression means comprising a matrix coupled to said processing means for receiving said memory address and for generating a threshold value based on said memory address, a compression block coupled to said processing means and said matrix, said compression block for receiving said threshold value and said data word and for providing an output value having a second number of bits less than said first number of bits, said compression block comprising:
first converting means for receiving said data word and for generating a BASE value based on said data word;
second converting means coupled to said first converting means for receiving said BASE value and said data word and for generating a DELTA value based on said BASE value and said data word;
first summing means for combining said DELTA value with said threshold value and providing a first output;
comparing means coupled to said first output and for generating a second output having a first value if said first output exceeds a reference value and a second value when said first output does not exceed said reference value;
second summing means for combining said BASE value and said second output and providing said output value having said second number of bits.

49. The circuit of claim 48 wherein said data word comprises first, second, and third components.

50. The circuit of claim 49 wherein said BASE and DELTA values are generated for each of said first, second, and third components.

51. The circuit of claim 49 wherein said first component is a red component, said second component is a green component and said third component is a blue component.

52. The circuit of claim 51 wherein further including means for comparing said red, green, and blue components of said data word and for generating said output value with equal red, green, and blue components when said red, green, and blue components of said data word are equal.

53. The circuit of claim 48 wherein said data word comprises first, second, third, and fourth components.

54. The circuit of claim 53 wherein said BASE and DELTA values are generated for each of said first, second, third, and fourth components.

55. The circuit of claim 53 wherein said first component is a red component, said second component is a green component, said third component is a blue component, and said fourth component is an alpha component.

56. The circuit of claim 55 wherein further including means for comparing said red, green, and blue components of said data word and for generating said output value with equal red, green, and blue components when said red, green, and blue components of said data word are equal.

57. The circuit of claim 48 wherein said first converting means generates said BASE value as follows:

$$BASE = (\text{source data} - (\text{source data}/16))/16,$$

where source data represents an intensity level of said data word.

58. The circuit of claim 48 wherein said second converting means generates said DELTA value as follows:

$$DELTA = (\text{source data} - (BASE \times 16)),$$

where source data represents an intensity level of said data word.

59. The circuit of claim 48 wherein said compression block comprises:
converting means for receiving said data word and for generating a BASE value and a DELTA value based on said data word;
first summing means for combining said DELTA value with said threshold value and providing a first output;
comparing means coupled to said first output and for generating a second output having a first value if said first output exceeds a reference value and a second value when said first output does not exceed said reference value;
second summing means for combining said BASE value and said second output and providing said output value having said second number of bits.

60. The circuit of claim 59 wherein said first converting means generates said BASE value as follows:

$$BASE = (\text{source data} - (\text{source data}/16))/16,$$

where source data represents an intensity level of said data word.

61. The circuit of claim 59 wherein said second converting means generates said DELTA value as follows:

$$DELTA = (\text{source data} - (\text{source data}/16)) \text{ modulo } 16,$$

where source data represents an intensity level of said data word.

62. The circuit of claim 48 wherein said storage means has a first address space and a second address space.

63. The circuit of claim 62 further including address decoding means coupled to said processing means to determine if said memory address provided by said processing means is found in said first or second address space;
said compression means for compressing said data word only when said data word is written to said first address space.

* * * * *